United States Patent [19]

Ortloff et al.

[11] 4,362,325
[45] Dec. 7, 1982

[54] LIMITED ANGLE PIGGABLE SWIVEL

[75] Inventors: John E. Ortloff; W. Robert Wolfram, Jr., both of Houston, Tex.

[73] Assignee: Exxon Production Research Co., Houston, Tex.

[21] Appl. No.: 207,482

[22] Filed: Nov. 17, 1980

[51] Int. Cl.³ ............................................. F16L 27/08
[52] U.S. Cl. .................................... 285/190; 285/136; 285/281; 15/104.06 R
[58] Field of Search ............... 285/273, 274, 282, 136, 285/190, 281

[56] References Cited

U.S. PATENT DOCUMENTS

| | | | |
|---|---|---|---|
| 1,220,270 | 3/1917 | Phillips | 285/274 X |
| 2,480,858 | 9/1949 | Hobbs | 285/190 |
| 3,874,706 | 4/1975 | Arnold | 285/184 |
| 4,142,741 | 3/1979 | Fiala | 285/190 |
| 4,174,127 | 11/1979 | Corn | 285/190 |
| 4,183,559 | 1/1980 | Stafford et al. | 285/136 X |

*Primary Examiner*—Dave W. Arola
*Attorney, Agent, or Firm*—Richard F. Phillips

[57] ABSTRACT

A limited angle piggable swivel comprising a stationary cylindrical shaft and a rotatable housing member circumferentially mounted around the shaft in sealing engagement. The shaft has a conduit extending from the base to the side. The housing member has a passageway extending therethrough. The rotatable housing member is mounted on the shaft to permit coaxial alignment of the inner end of the housing passageway with the side end of the shaft conduit when the housing member is rotated around the shaft to the proper position. In a preferred embodiment of the present invention, both the inner end of the passageway and the side end of the conduit are flared outwardly to enable the swivel to be pigged in either direction when the longitudinal axis of the passageway is offset from the longitudinal axis of the side end of the conduit.

3 Claims, 7 Drawing Figures

LIMITED ANGLE PIGGABLE SWIVEL

BACKGROUND OF THE INVENTION

1. Field of the Invention

The present invention relates to apparatus useful in transferring fluids and in particular, the present invention relates to piggable fluid swivels which can be used for example, to bypass fluid lines around the universal joints of production risers.

2. Description of the Prior Art

During the past several years the search for oil and gas in offshore areas has greatly expanded and has now progressed into deep waters such as those found in the North Sea. To facilitate production of oil and gas from remotely located offshore fields, complex tanker mooring systems, serving as a centralized production site for the entire field, have been developed. Normally, a production riser having one or more hard fluid lines extending from a subsea location along the length of the riser to the mooring site permit the transfer of fluids between the subsea location and a tanker moored to the mooring site. Certain fluid lines may be used to convey oil and gas from the subsea location into the tanker while other fluid lines may be used to inject liquids or gases back into the field for the purpose of well stimulation or storage.

Under the influence of wind and waves, the riser will tend to move in various directions about its axis. To permit the riser to move freely without breaking, the riser is normally provided with one or more universal joints along its length. The hard fluid lines associated with the riser are normally provided with a plurality of fluid swivels to bypass the lines around the universal joints. Normally, in most sea states, riser movement is minimal and the fluid swivels do not pivot more than about ±15°.

Many crude oils contain solid materials, such as wax or asphalt, which stick to the walls of the fluid lines and fluid swivels. With use, these solid materials are deposited on the walls of the fluid lines and swivels. These deposits reduce the effective internal diameter of the lines and swivels and impede the flow of fluid therethrough even to the point of total blockage. It is customary in the oil industry to force a scraping device known as a pig through pipelines to remove solids deposited on the inside walls. A pig generally is a spherical, cylindrical or ellipsoidal shaped and is selected to have a circumferential dimension equal to or slightly greater than the circumferential dimension of the pipeline. It is normally necessary to periodically force a pig through pipelines to clean the pipelines.

Prior piggable fluid swivels are disclosed in U.S. Pat. Nos. 4,174,127 and 4,183,559. U.S. Pat. No. 4,174,127 discloses a swivel comprising generally a stationary shaft and a rotatable housing member circumferentially mounted thereon. The swivel also has a circumferential pig raceway and a pig deflector. The pig passes from a first fluid line extending through the shaft into the swivel raceway. The deflector catches the pig and moves it through the housing member and out of the swivel into a second fluid line. Unfortunately, the swivel can only be pigged in one direction. Further the diameter of the swivel must be increased substantially to accommodate the raceway. The increased diameter causes a substantial increase in the overall weight and size of the swivel and presents greater handling problems for the swivel. U.S. Pat. No. 4,183,559 discloses a similar type of swivel having circumferential raceways formed in a spiral. Unfortunately the overlapping raceways cause turbulent fluid flow through the swivel. Thus, there is a need in the art for a relatively light weight improved piggable fluid swivel.

SUMMARY OF THE INVENTION

The present invention relates to a limited angle piggable fluid swivel. The swivel is capable of being pigged and transferring fluids through a limited angle of rotation. The swivel may be utilized to bypass hard fluids lines around the universal joints of a riser where swivels in normal sea states experience limited pivotal movement. The swivel preferably comprises one or more modules each comprising a stationary cylindrical shaft and a rotatable housing member circumferentially mounted arounding the shaft in sealing engagement. The modules may be mounted or stacked and are preferably fixedly attached to one another.

Each shaft is preferably hollow and has positioned therein a conduit having a first base portion extending coaxially from the base of the shaft into the body of the shaft and a second side portion gently angled to extend through the side of the shaft. Alternatively, the shaft can be solid having a bore formed therein extending from the base of the shaft to the side of the shaft. The base end of the conduit is adapted to mate with a first fluid line. For example, the conduit may be provided with a flanged connector. The rotatable housing member sealingly engages the side of the shaft and is free to rotate 360° around the shaft. The housing member is provided with a passageway extending therethrough and having an inner and an outer end. The outer end of the passageway is adapted to mate with a second fluid line. The rotatable housing member is mounted on the shaft to permit coaxial alignment of the inner end of the housing passageway with the side end of the shaft conduit when the housing member is rotated around the shaft to the proper position. Thus when the housing passageway is aligned with the shaft conduit, there exists a continuous fluid flow path through the swivel from a first fluid line at the base of the swivel through the conduit and passageway to the second fluid line at the side of the swivel. In one embodiment of the present invention, the inner end of the passageway is flared outwardly an amount sufficient to enable a pig having a circumferential dimension substantially equal to the circumferential dimension of the conduit to pass from the conduit into the passageway when the longitudinal axis of the passageway is angularly offset from the longitudinal axis of the side end of the conduit. In another embodiment, the side end of the conduit maybe be flared outwardly to enable passage of a pig from the passageway to the conduit when the longitudinal axis of the passageway is angularly offset from the longitudinal axis of the side end of the conduit. In a preferred embodiment of the present invention, both the inner end of the passageway and the side end of the conduit are flared outwardly to enable the swivel to be pigged in either direction when the longitudinal axis of the passageway is angularly offset from the longitudinal axis of the side end of the conduit.

BRIEF DESCRIPTION OF THE DRAWING

A more thorough disclosure of the advantages of the present invention is presented in the detailed description which follows and from the accompanying drawings in which.

DESCRIPTION OF THE PREFERRED EMBODIMENT

Figure 1:
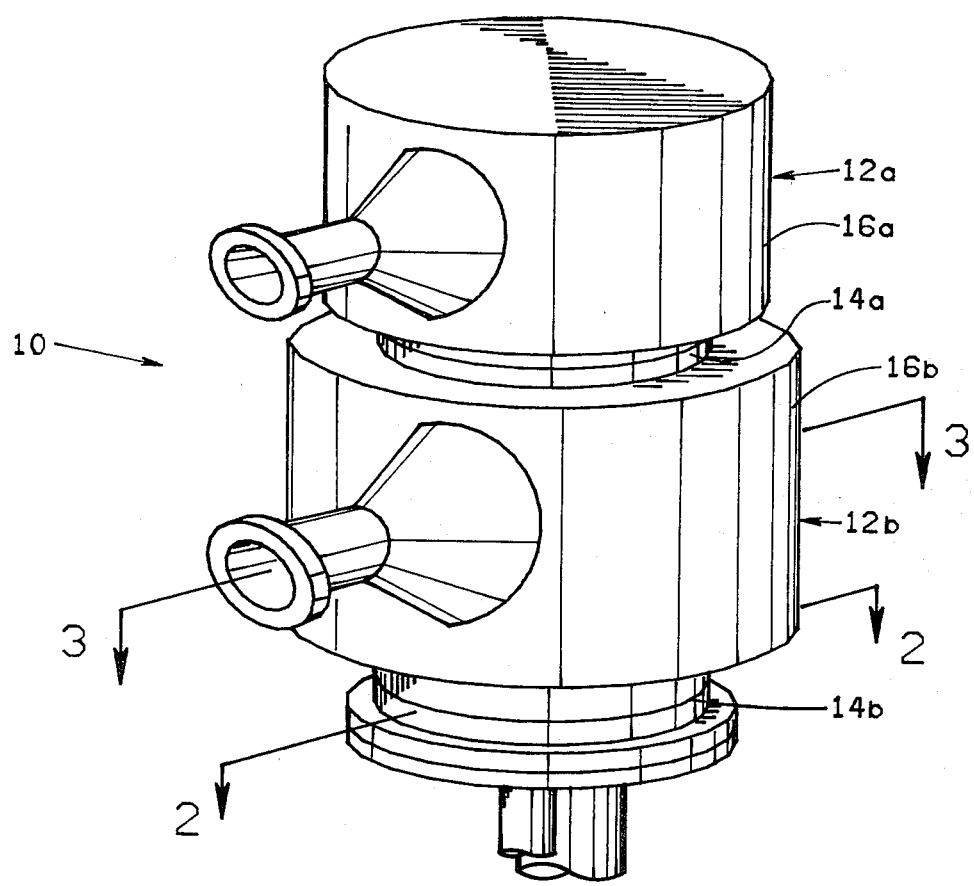
FIG. 1 is a perspective view of a swivel comprising two modules formed according to the present invention.
Figure 2:
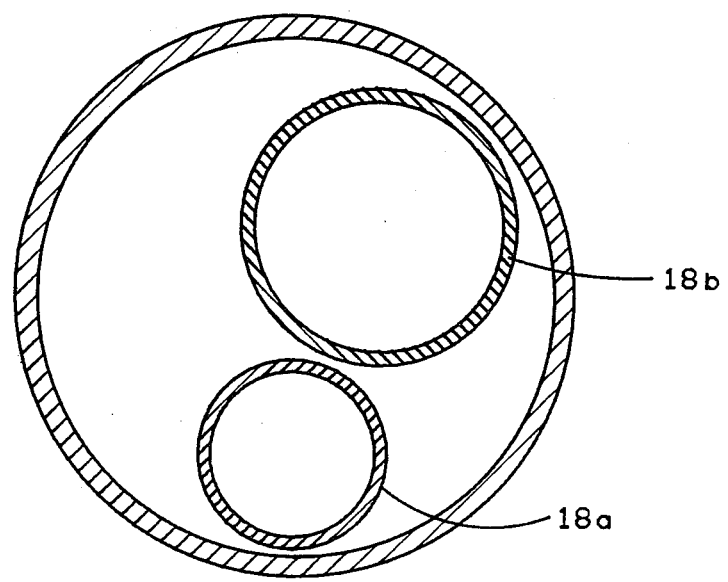
FIG. 2 is a cross-sectional view of the base of the swivel along plane 2—2 of FIG. 1.
Figure 3A:
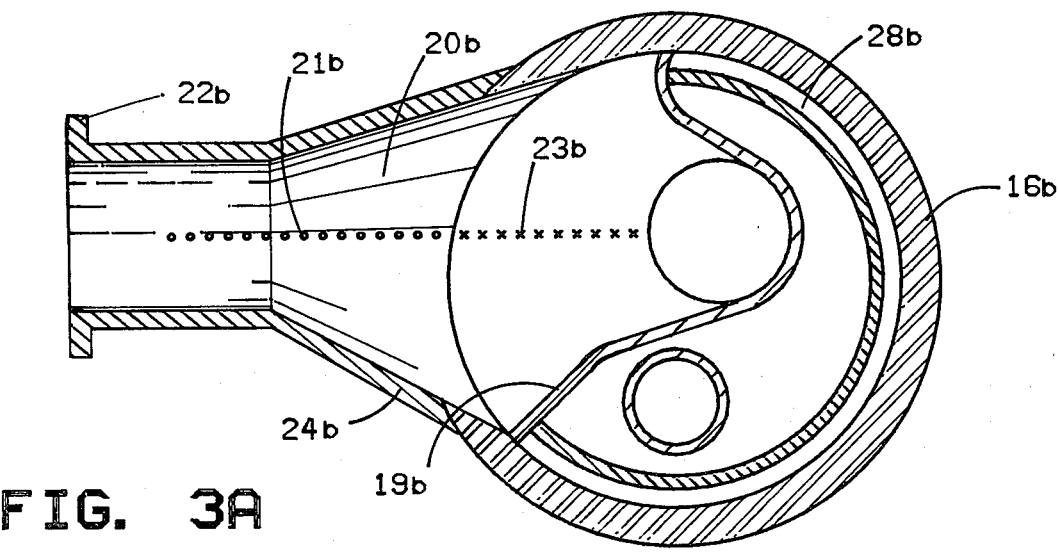
FIG. 3 (A-C) are cross-sectional views of a swivel module taken along plane 3—3 of FIG. 1.
Figure 3B:
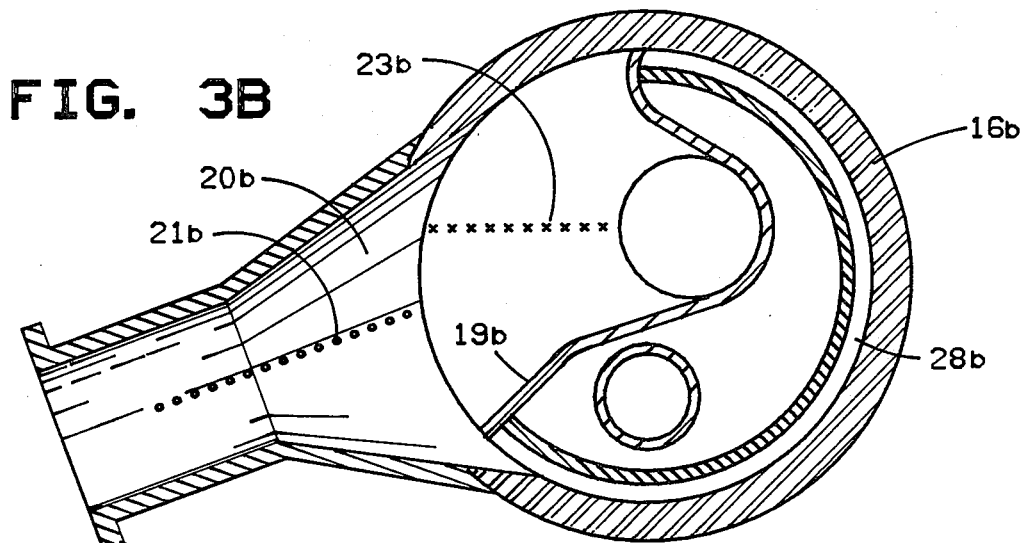
Figure 3C:
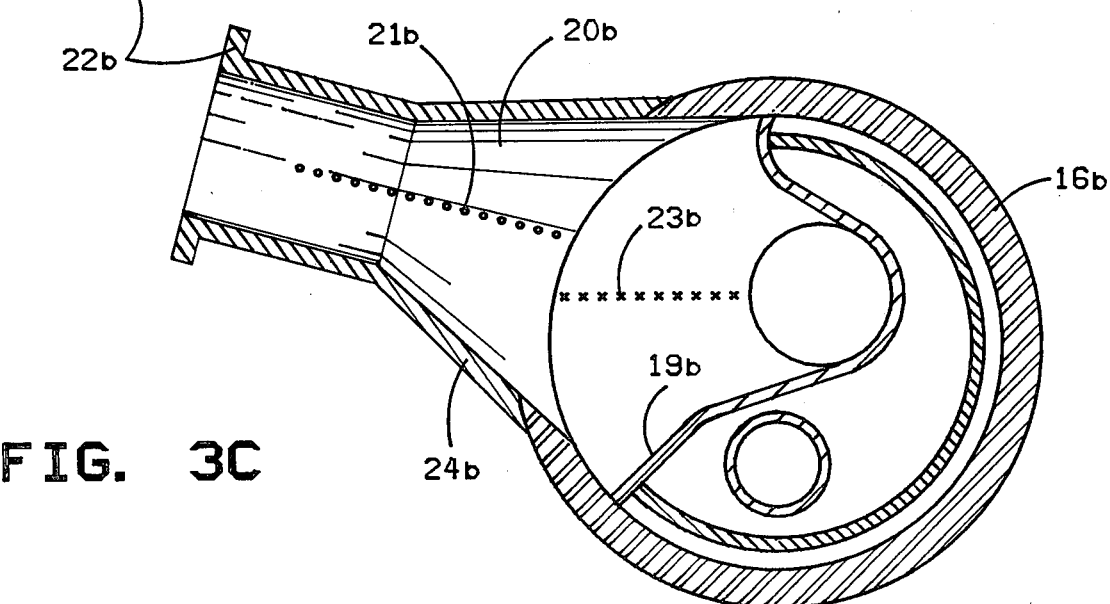
Figure 4:
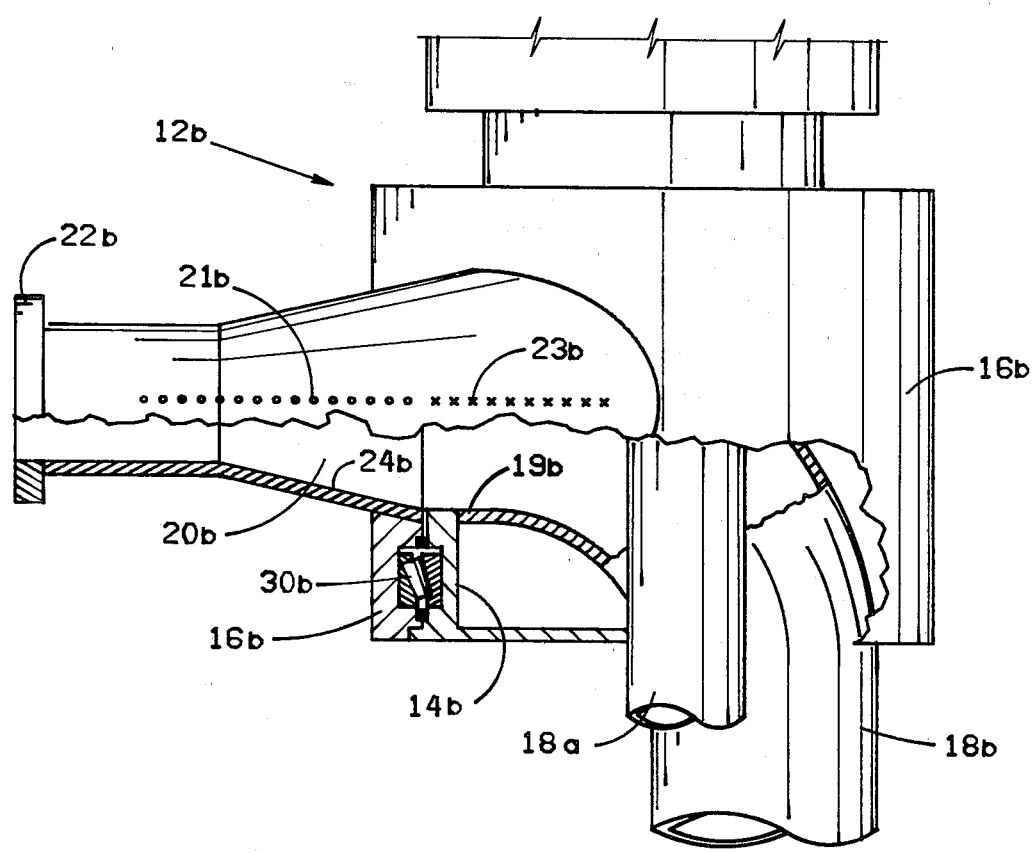
FIG. 4 is a side view, partially in section, of a swivel module according to the present invention.

Referring to FIGS. 1-4, the swivel 10 contains two modules 12a-b, stacked and mounted together. Each module comprises a stationery cylindrical shaft 14a-b and a rotatable housing member 16a-b circumferentially mounted around the shaft in sealing engagement. Referring to FIG. 4, there is shown a side view, partially in section, of module 12b. Hollow shaft 14b has positioned therein conduits 18a and 18b. Conduit 18a extends through hollow shaft 14b up into shaft 14a of module 12a. Conduit 18b extends from the base of the shaft 14b to the side of the shaft 14b. The side portion 19b of conduit 18b has longitudinal axis 23b. The base end of conduit 18b is provided with means such as flanged connection (not shown) to enable its connection with a first fluid line (not shown).

Figure 5:
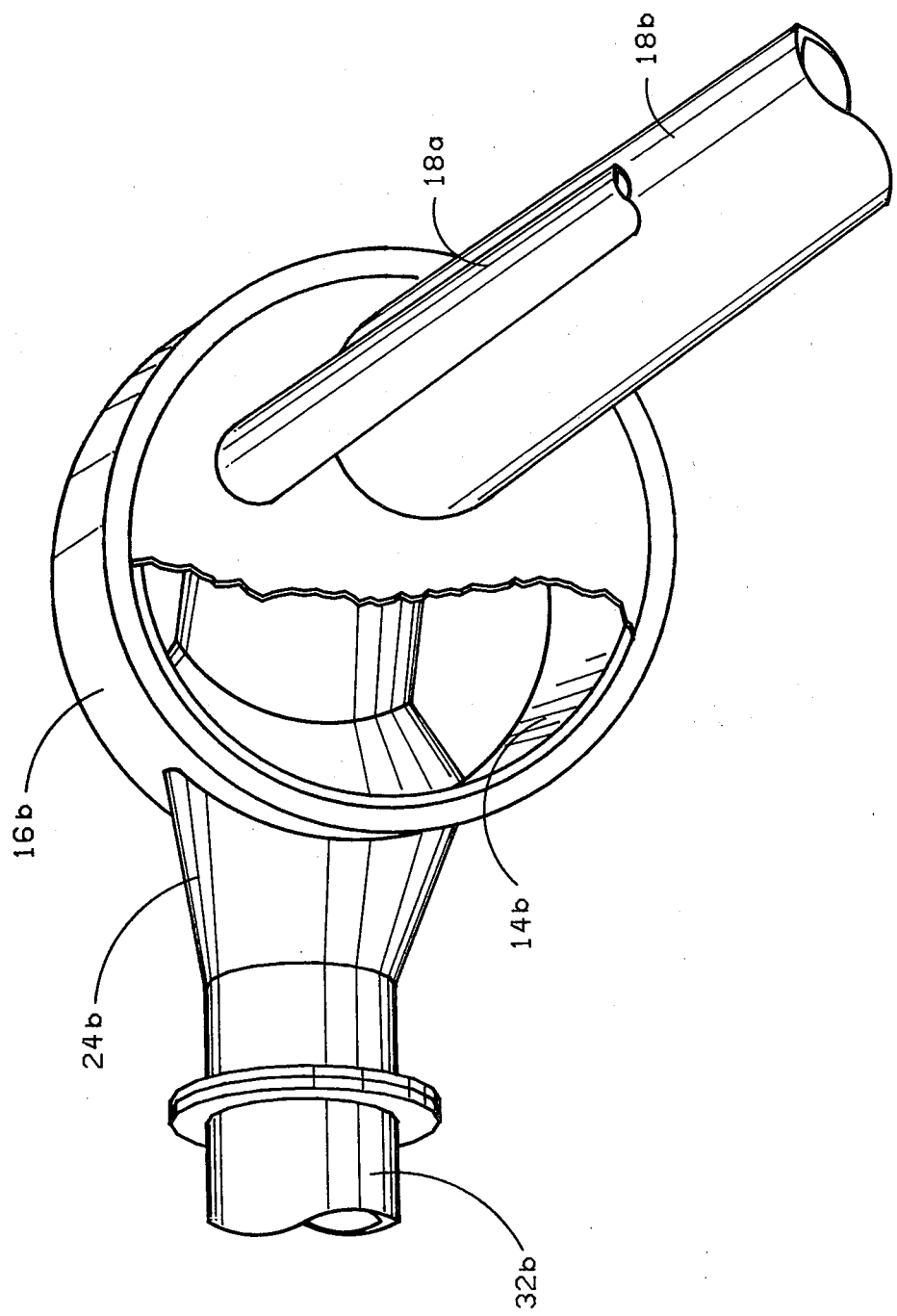
FIG. 5 is a bottom view; partially in section of a swivel module according to the present invention.

Referring to FIGS. 3 and 4, the rotatable housing member 16b is provided with a passageway 20b extending therethrough and having a longitudinal axis 21b. The outer end of the passageway may be provided with flanged connection 22b to enable its connection to a second fluid line 32b (see FIG. 5). The rotatable housing member 16b is capable of rotating completely around the stationary shaft 14b. As shown in FIGS. 3A and 4, the rotatable housing member 16B is positioned along the length of the shaft 14b to permit coaxial alignment of the longitudinal axis 21b of passageway 20b and the longitudinal axis 23b of the side end of conduit 18b when the housing member is rotated around the shaft to the proper position. When the passageway 20b is generally aligned with side portion of conduit 18b, the module permits fluid communication therethrough from the first fluid line connected to the conduit 18b to the second fluid line connected to the passageway 20b. Generally, the passageway and the conduit will have the same diameter as the fluids lines. When the housing member 16b is rotated around shaft 14b so that no portion of the passageway 20b is in alignment with conduit 18b limited fluid flow through the swivel module may be achieved through annular channel 28b formed between the housing and the shaft. Referring to FIG. 4, the sealing means 30b between housing 16b and shaft 14b comprises bearings and sealing elements and may be any type of sealing means known to those skilled in the art. The sealing means is preferably the type similar to that disclosed in U.S. Pat. No. 4,126,336 which is incorporated herein by reference.

Referring to FIGS. 3-4, in a preferred embodiment of the present invention, both the inner end 24b of passageway 20b and the side end 19b of conduit 18b are flared outwardly. The passageway and the conduit are flared outwardly in an amount sufficient to enable a pig having a circumferential dimension substantially equal to the circumferential dimension of the unflared portion of the conduit and the passageway to pass between the conduit and the passageway when, as shown in FIGS. 3B and 3C, the housing member 16b is rotated with respect to shaft 14b so that the longitudinal axis 21b of the passageway 20b is angularly offset from the longitudinal axis 23b of the side end of conduit 18b. The flared ends also permit substantially uninterrupted fluid flow through the module through a greater degree of rotation of the housing member.

If it is only desired to pass a pig through the module in one direction, only the passageway or conduit need be flared. For example, if it is only desired to pass a pig through the module from the conduit to the passageway it is only necessary to flare the inner side of the passageway to permit passage of the pig when the conduit and the passageway are not coaxially aligned.

The amount of flare required depends on the desired range of misalignment during which the swivel may be pigged. As a general rule, for the housing passageway and for a shaft conduit having a centrally located base portion, the passageway and the conduit may be flared about one degree (1°) on each side for each degree of rotational piggability desired. Thus, for example, if it were desired to have two way pigging capability through a 30 degree arc of rotation of the housing member around the shaft (±15 degrees from coaxial alignment of the passageway and conduit) the side end of the conduit and the inner end of the housing passageway may each be flared 15° on each side. It would be obvious to one skilled in the art that when the base portion of the conduit is off centered within the shaft, different angles of flare will be required for the conduit.

The swivel shown in FIGS. 1 through 5 may be utilized to bypass hard fluid lines around the universal joints of a riser. The swivel is provided with two modules which permit fluid flow in either direction. Thus, the swivel module 12a may perform the function of gas injection while the swivel module of 12b may perform the function of oil production. The swivel may be provided with additional modules to handle additional fluid lines varying diameters and functions.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of appended claims.

We claim:

1. A fluid swivel comprising a stationary cylindrical shaft and a rotatable housing member, said shaft having a conduit positioned therein extending from the base of said shaft to the side of said shaft, said base end of said conduit adapted to mate with a first fluid line, said rotatable housing member circumferentially mounted around said shaft in sealing engagement, said housing member having a passageway extending therethrough having an inner and outer end, said outer end adapted to mate with a second fluid line, said housing member adapted to rotate around said shaft to enable coaxial alignment of said conduit and said passageway, said inner end of said passageway being flared outwardly in an amount sufficient to enable a traveling member, having a circumferential dimension substantially equal to circumferential dimension of said conduit, to pass from said conduit to said passageway when the longitudinal axis of said passageway is angularly offset from the longitudinal axis of the side end of said conduit.

2. A fluid swivel comprising a stationary cylindrical shaft and a rotatable housing member, said shaft having a conduit positioned therein extending from the base of said shaft to the side of said shaft, said base end of said conduit adapted to mate with a first fluid line, said rotatable housing member circumferentially mounted around said shaft in sealing engagement, said housing member having a passageway extending therethrough having an inner and outer end, said outer end adapted to mate with a second fluid line, said housing member adapted to rotate around said shaft to enable coaxial alignment of said conduit and said passageway, said side end of said conduit being flared outwardly in an amount sufficient to enable a traveling member having a circumferential dimension substantially equal to circumferential dimension of said passageway to pass from said passageway to said conduit when the longitudinal axis of said passageway is angularly offset from the longitudinal axis of the side end of said conduit.

3. A fluid swivel comprising a stationary cylindrical shaft and a rotatable housing member, said shaft having a conduit positioned therein extending from the base of said shaft to the side of said shaft, said base end of said conduit adapted to mate with a first fluid line, said rotatable housing member circumferentially mounted around said shaft in sealing engagement, said housing member having a passageway extending therethrough having a diameter substantially equal to the diameter of said conduit and having an inner and outer end, said outer end adapted to mate with a second fluid line, said housing member adapted to rotate around said shaft to enable coaxial alignment of said conduit and said passageway, said inner end of said passageway and the side end of said conduit being flared outwardly in an amount sufficient to enable a traveling member, having a circumferential dimension substantially equal to circumferential dimension of said conduit, to pass between said conduit and said passageway when the longitudinal axis of said passageway is angularly offset from the longitudinal axis of the side end of said conduit.

* * * * *